US011508330B2

(12) United States Patent
Boev et al.

(10) Patent No.: US 11,508,330 B2
(45) Date of Patent: Nov. 22, 2022

(54) DISPLAY DEVICE AND METHOD BASED ON DISCARDING BITS FROM A BIT SEQUENCE

(71) Applicant: Huawei Technologies Co., Ltd., Shenzhen (CN)

(72) Inventors: Atanas Boev, Munich (DE); Panji Setiawan, Munich (DE); Bogdan Cihodariu Ionita, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/504,356

(22) Filed: Oct. 18, 2021

(65) Prior Publication Data

US 2022/0036855 A1 Feb. 3, 2022

Related U.S. Application Data

(63) Continuation of application No. PCT/EP2019/060036, filed on Apr. 18, 2019.

(51) Int. Cl.
*G09G 5/10* (2006.01)
*G09G 5/04* (2006.01)
*G09G 5/39* (2006.01)

(52) U.S. Cl.
CPC ............... *G09G 5/04* (2013.01); *G09G 5/10* (2013.01); *G09G 5/39* (2013.01); *G09G 2300/0439* (2013.01)

(58) Field of Classification Search
CPC .. G09G 5/04; G09G 5/10; G09G 5/39; G09G 2300/0439

(Continued)

(56) References Cited

U.S. PATENT DOCUMENTS

2003/0098860 A1* 5/2003 Nakamura ........... G09G 3/3685
345/211
2005/0093849 A1* 5/2005 Myers .................... G09G 5/006
345/204
(Continued)

FOREIGN PATENT DOCUMENTS

CN 107733441 A 2/2018
DE 102015112474 A1 2/2017
(Continued)

OTHER PUBLICATIONS

"DLP Technology for Near Eye Display, Application Report," White Paper, Texas Instruments Incorporated, total 18 pages (Sep. 2014). (Year: 2014).*

(Continued)

*Primary Examiner* — Jonathan M Blancha
(74) *Attorney, Agent, or Firm* — Leydig, Voit & Mayer, Ltd.

(57) ABSTRACT

The present disclosure provides a device, in particular a multifocal display device. The device includes: a display element configured to generate an image; and a controller configured to control the display element according to at least a first bit sequence provided over a first determined time period and a second bit sequence provided over a second determined time period, in order to generate the image with one or more colors, the bit sequences including for each color a number of bits of different significance. Moreover, the device is configured to generate the first bit sequence from an original bit sequence based on discarding at least one bit of a color and to generate the second bit sequence from the original bit sequence based on discarding at least one other bit of the color.

12 Claims, 7 Drawing Sheets

(58) Field of Classification Search
USPC .......................................................... 345/690
See application file for complete search history.

(56) References Cited

U.S. PATENT DOCUMENTS

| | | | |
|---|---|---|---|
| 2008/0239454 A1* | 10/2008 | Ichikawa | G02B 26/0841 359/290 |
| 2009/0305680 A1* | 12/2009 | Swift | H04L 43/00 455/414.1 |
| 2013/0021229 A1* | 1/2013 | Ludden | G09G 3/3688 345/89 |
| 2016/0014707 A1 | 1/2016 | Ro et al. | |
| 2016/0147078 A1 | 5/2016 | Bedard et al. | |
| 2016/0247460 A1* | 8/2016 | Kim | G09G 3/3413 |

FOREIGN PATENT DOCUMENTS

| | | |
|---|---|---|
| JP | 2004138789 A | 5/2004 |
| WO | 2019020190 A1 | 1/2019 |

OTHER PUBLICATIONS

Lambooij et al., "Visual Discomfort and Visual Fatigue of Stereoscopic Displays: A Review," in Journal of Imaging Science and Technology, vol. 53, No. 3, total 14 pages (2009). (Year: 2009).*

Narain et al., "Optimal Presentation of Imagery with Focus Cues on Multi-Plane Displays," in ACM Trans. On Graphics, vol. 34, No. 4, Article 59, total 12 pages (Aug. 2015). (Year: 2015).*

"Principles of Time Domain Imaging," Forth Dimension Displays Limited, total 19 pages (2013). (Year: 2013).*

DLP Technology for Near Eye Display, Application Report, White Paper, Texas Instruments Incorporated, total 18 pages (Sep. 2014).

Kramida, "Resolving the Vergence-Accommodation Conflict in Head-Mounted Displays," IEEE Transactions on Msualization and Computer Graphics, vol. 22, No. 7, total 20 pages (Jul. 2016).

Lambooij et al., "Visual Discomfort and Visual Fatigue of Stereoscopic Display: A Review," in Journal of Imaging Science and Technology, vol. 53, No. 3, total 14 pages (2009).

Hu et al., "Design and Assessment of a Depth-Fused Multi-Focal-Plane Display Prototype," Journal of Display Technology, vol. 10, No. 4, pp. 308-316 (Apr. 2014).

Wu et al., "Content-Adaptive Focus Configuration for Near-Eye Multi-Focal Displays," in IEEE Intl. Conf. on Multimedia and Expo (ICME), total 6 pages (Jul. 2016).

Narain et al., "Optimal Presentation of Imagery with Focus Cues on Multi-Plane Displays," in ACM Trans. on Graphics, Nol. 34, No. 4, Article 59, total 12 pages (Aug. 2015).

"Fast Electrically Tunable Lens EL-10-30-Series," Datasheet: EL-10-30-Series, Optotune, total 16 pages (2017).

Shibata et al., "The zone of comfort: Predicting visual discomfort with stereo displays," in Journal of Vision, total 29 pages (Jul. 2011).

Anonymous, "TI training and videos," >Applications and designs, Retrieved from the internet:http://www.ti.com/general/docs/video/watch.tsp?entryid=5157963226001. on Mar. 18, 2020, total 2 pages.

Sommerich, "How DLP works," Tutorial, in AV Asia Pacific Magazine, pp. 64-65 (2009).

"Principles of Time Domain Imaging," Forth Dimension Display Limited, total 19 pages (2013).

* cited by examiner

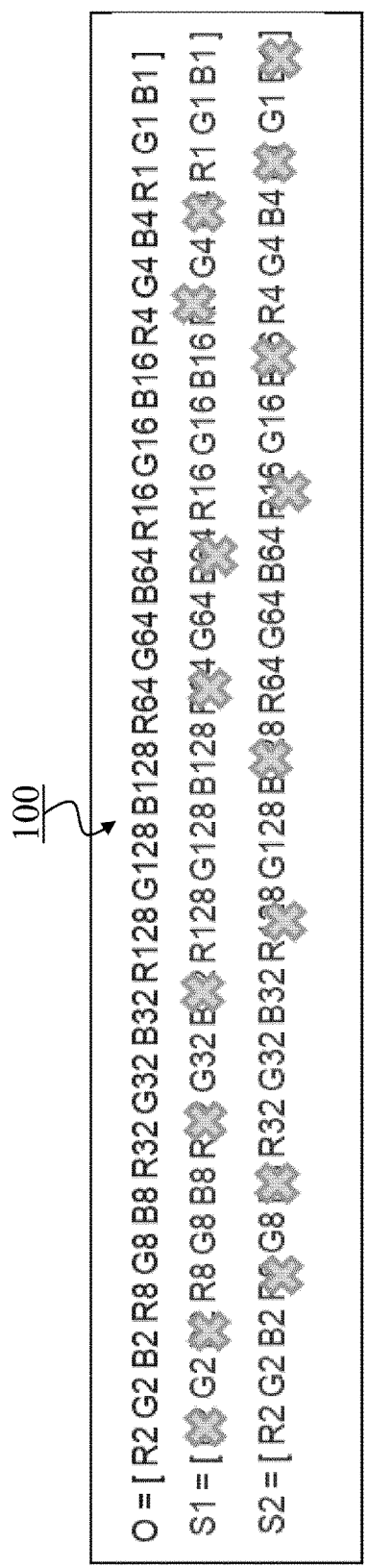
FIG. 3A
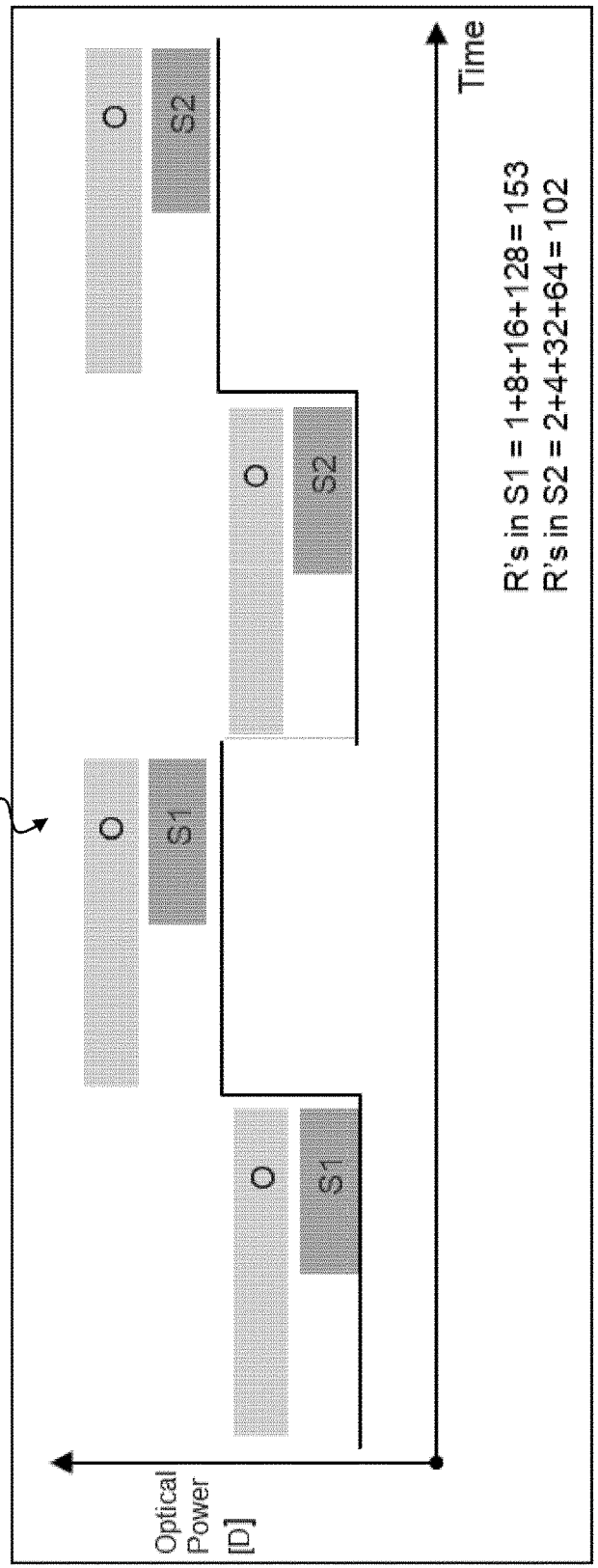
FIG. 3B
FIG. 3

DISPLAY DEVICE AND METHOD BASED ON DISCARDING BITS FROM A BIT SEQUENCE

CROSS-REFERENCE TO RELATED APPLICATIONS

This application is a continuation of International Application No. PCT/EP2019/060036, filed on Apr. 18, 2019, the disclosure of which is hereby incorporated by reference in its entirety.

TECHNICAL FIELD

The present disclosure relates to a Multifocal Display (MFD) device and a corresponding method for providing a multifocal display. The MFD device of the disclosure can be used for a Near Eye Display (NED) device, or a Near-To-Eye (NTE) application or device, or a Head Mounted Display (HMD) device. The present disclosure is particularly concerned with providing color to images produced by the MFD device and the method.

BACKGROUND

MFD devices have recently received increasing attention in industry, due to their ability to create a small and portable personal viewing experiment. MFD devices may be applied in the category of Augmented Reality (AR), which typically utilizes a See-Through NED device, and in the category of Virtual Reality (VR), which typically utilizes an Immersive NED device.

An example MFD device is shown in FIG. 6. The MFD device shown here in FIG. 6 is of the time-multiplexed type (in contrast to an also known spatial-multiplexed MFD device type). In this example MFD device, the viewing distance of a single 2D display from an eye of the user is rapidly switched in synchronization with the rendering of frames of multifocal planes, in order to create a potentially flicker-free perception of a 3D image.

Therefore, on the one hand side, an ultrafast display element is required, in order to sequentially display color images at a flicker fusion threshold speed of e.g. a 60 Hz frame rate. In fact this display element is a key component for Digital Light Processing (DLP) carried out in the MFD device. The ultrafast display element may comprise a Digital Micromirror Device (DMD) or a Liquid Crystal on Silicon (LCOS) device, e.g. a Ferroelectric LCOS (FLCOS) device.

A DMD device includes a plurality of micromirrors, wherein each mirror is one pixel of an image to be displayed. The micromirrors are configured to tilt either towards a light source (ON) or away from the light source (OFF), in order to create a light or dark pixel on a projection surface or screen, onto which the light of the light source can be reflected by the micromirrors. Typically, an n-bit binary sequence is used to display $2^n$ greyscale levels (or binary patterns) either by using a Pulse Width Modulation (PWM) or a variable intensity illumination method, wherein the latter is capable of supporting a significantly higher frame rate.

Additionally, the ultrafast display element typically comprises a color element, for instance, realized by a rotating glass wheel with segments of different colors. The color element is arranged between the light source and the DMD, and is employed to provide a color to the light of the light source that illuminates the DMD. Thus, a color image may be produced. This implies that the display element comprising the color element and the DMD is controlled by a sequential binary pattern (bit sequence) defining color and exposure arrangement. This is usually known as field sequential color (FSC) operation or Round-robin.

In the time-multiplexed MFD device, an image which corresponds to a certain depth is played sequentially at its exact focal plane as illustrated in FIG. 7. An image sequence I0, I1, I2, I3, which corresponds to a certain depth (or focal plane) sequence represented by a staircase function (of optical power), is sequentially played within a time period of 1/60 s. FIG. 7 shows how different focus planes (here also four focal planes of different indices 1 to 4 are illustrated) are controller over time (x-axis). The optical power D of the focus tunable lens is plotted in FIG. 7 (on the y-axis), and may be adjusted by applying a control signal of changing value. For example, a signal of changing current intensity may be applied to change focal planes (optical power), one current intensity for each optical power of the lens. Accordingly, for generating optical power steps (jumps between two focal planes), in order to rapidly change between different focal planes, a control signal in the form of a current step is preferably applied.

However, devices and methods have the disadvantage of providing a relatively low frame rate. Moreover, in the multifocal plane display area, not much has been done to increase the frame rate.

Furthermore, the example MFD device and methods generate bit sequences (e.g., for different focal plane images) that create color artifacts in the displayed images. For example, the artifacts may occur during the optical power transitions, since the highest intensity illumination of a particularly binary color pattern (e.g. B128) in one focal plane image may be followed by the lowest intensity illumination of the next binary color pattern (e.g. R1) in another focal plane image. This situation along with the low frame rates can significantly influence the impression of the overall generated multifocal (color) display.

SUMMARY

In view of the above-mentioned problems and disadvantages, embodiments of the present disclosure aim to improve MFD devices and methods. An objective is to provide an MFD device and method that achieve a higher frame rate without losing image quality (at least not significantly).

The objective of the present disclosure is achieved by the solution provided in the enclosed independent claims. Advantageous implementations of the present disclosure are further defined in the dependent claims.

In particular, embodiments of the disclosure base on generating bit sequences based on re-ordering/re-arranging the conventional binary pattern (in the following only referred to as "bit sequence") and/or discarding at least one bit of a color. For example, in some embodiments, half of the bits (i.e., bit planes) for Red color and/or Blue color may be discarded. Moreover, the generated first and second bit sequences may provide the advantage of increasing the frame rate significantly, and further guarantying the quality by ensuring the resulting bit sequence does not decrease the perceived quality.

A first aspect of the disclosure provides a device, in particular a multifocal display (MFD) device, comprising a display element configured to generate an image; and a controller configured to control the display element according to at least a first bit sequence provided over a first determined time period and a second bit sequence provided over a second determined time period, in order to generate the image with one or more colors, the bit sequences including for each color a number of bits of different significance; wherein the device is configured to generate the first bit sequence from an original bit sequence based on discarding at least one bit of a color and to generate the second bit sequence from the original bit sequence based on discarding at least one other bit of the color.

The device may be the MFD device. The MFD device may include a circuitry which may comprise hardware and software. The hardware may comprise analog or digital circuitry, or both analog and digital circuitry. The digital circuitry may comprise components such as application-specific integrated circuits (ASICs), field-programmable arrays (FPGAs), digital signal processors (DSPs), or multi-purpose processors. In some embodiments, the circuitry comprises one or more processors and a non-volatile memory connected to the one or more processors. The non-volatile memory may carry executable program code which, when executed by the one or more processors, causes the device to perform the operations or methods described herein.

The MFD device generates the first bit sequence and the second bit sequence which may have the advantage of (significantly) reducing the bitrate. For example, in some embodiments the 50% of bits of a predetermined color (e.g., for the Red color and Blue color) may be reduced.

Additionally, at least two alternating bit sequences (i.e., the first bit sequence and the second bit sequence) per frame may be used such that the intensity variation between the sequences is minimum. Note that, a frame consisting of four focal plane images can have two alternating sequences each being repeated twice.

Moreover, in some embodiments, the device may generate improved color images for the multifocal display.

In an implementation form of the first aspect, generating the first bit sequence and/or the second bit sequence from the original bit sequence comprises arranging a less significant bit of a color closer to, or at the same distance to, a start and/or an end of the bit sequence than a more significant bit of the same color.

This is beneficial, since such an arrangement of the less significant bit (LSB) (corresponding to the lowest intensity illuminations) of each color appears at the start and end of each frame exposure sequence, and thus where the oscillation artifacts are expected to be strongest. Furthermore, the most significant bit (MSB) of each color does not appear at these positions, and thus the artifacts occurring during optical power transitions of a focus tunable lens impact only on the LSBs. This reduces color artifacts in the final integrated image, and improves the overall color image generated.

In a further implementation form of the first aspect, a bit of given significance of Red color and/or Blue color is arranged closer to the start and/or the end of the bit sequence than a bit of the same significance of Green color.

This is beneficial, since the human eye sensitivity to different colors is taken into account. In particular, since the human eye is more sensitive to Green, and less sensitive to Blue and Red, these latter colors appear at the positions, where the optical response artifacts occur.

In a further implementation form of the first aspect, an even bit of a color is arranged closer to the start of the bit sequence than an odd bit of the same color, while an odd bit of the same color is arranged closer to the end of the bit sequence than an even bit of the same color, or an odd bit of a color is arranged closer to the start of the bit sequence than an even bit of the same color, while an even bit of the same color is arranged closer to the end of the bit sequence than an odd bit of the same color.

That means, for instance, that the even bit planes may be illuminated first based on some color arrangement, followed by illuminating the odd bit planes in, for instance, a reversed ordering based on the same color arrangement. The change of the arrangement in the middle of the bit sequence, which is a consequence of the specified odd/even bit arrangement, may expose a specific color during optical power transitions. For instance, the Blue color, to which the human eye is least sensitive, may be exposed during transitions of the optical power of the lens to the optical response artifacts.

In a further implementation form of the first aspect, even bits of different colors are arranged in the bit sequence in an order reversed to an order of odd bits of the same colors.

Thus, for each significance, the color, to which the human eye is least sensitive, can be positioned closer to the start or end of the bit sequence.

In a further implementation form of the first aspect, discarding the at least one bit of a color comprises discarding at least one even bit and/or at least one odd bit of at least one predetermined color.

This is beneficial, since it may generate shorter bit sequences per frame. Moreover, the generated first bit sequence and/or the sequence bit sequence may further have a constant binary pattern rate which may provide a higher frame rate.

In a further implementation form of the first aspect, the first bit sequence is generated based on discarding all even bits of the at least one predetermined color and the second bit sequence is generated based on discarding all odd bits of the at least one predetermined color.

For example, in some embodiments, the first bit sequence may be generated based on discarding half of the bits for the Red color and Blue color (e.g., all of the even bits or all of the odd bits) on a focal plane within a frame. In addition, the second bit sequence may be generated based on discarding the other half of the bits for the Red color and Blue color on the subsequent frame of the same focal plane. The frame rate may be increased and the generated first bit sequence and/or the second bit sequence may not decrease the perceived image quality.

In a further implementation form of the first aspect, the at least one predetermined color is Red color and/or Blue color.

This is beneficial, since the human eye is less sensitive to the Blue color and the Red color than the Green color, therefore, half of the bits for the Red color and Blue color may be discarded, and a higher frame rate may be provided.

In a further implementation form of the first aspect, the device is further configured to normalize the intensity of un-discarded color based on the intensity of the discarded colors.

In particular, the intensity of the Green color may be normalized in order to achieve the same intensity as the other colors.

In a further implementation form of the first aspect, the display element comprises a Digital Micromirror Device, DMD, or a Liquid Crystal On Silicon, LCOS, each bit of the bit sequence determines an intensity of light for illuminating the DMD or the LCOS, and a lower significant bit relates to a lower illumination intensity of the light.

A second aspect of the disclosure provides a method comprising steps of generating an image; controlling a display element according to at least a first bit sequence provided over a first determined time period and a second bit sequence provided over a second determined time period, in order to generate the image with one or more colors, the bit sequences including for each color a number of bits of different significance; and generating the first bit sequence from an original bit sequence based on discarding at least one bit of a color and to generate the second bit sequence from the original bit sequence based on discarding at least one other bit of the color.

In an implementation form of the second aspect, the method further comprises generating the first bit sequence and/or the second bit sequence from the original bit sequence by arranging a less significant bit of a color closer to, or at the same distance to, a start and/or an end of the bit sequence than a more significant bit of the same color.

In a further implementation form of the second aspect, the method further comprises arranging a bit of given significance of Red color and/or Blue color, closer to the start and/or the end of the bit sequence than a bit of the same significance of Green color.

In a further implementation form of the second aspect, the method further comprises arranging an even bit of a color, closer to the start of the bit sequence than an odd bit of the same color, and arranging an odd bit of the same color, closer to the end of the bit sequence than an even bit of the same color, or arranging an odd bit of a color, closer to the start of the bit sequence than an even bit of the same color, and arranging an even bit of the same color, closer to the end of the bit sequence than an odd bit of the same color.

In a further implementation form of the second aspect, the method further comprises arranging even bits of different colors, in the bit sequence, in an order reversed to an order of odd bits of the same colors.

In a further implementation form of the second aspect, the method further comprises discarding at least one even bit and/or at least one odd bit of at least one predetermined color.

In a further implementation form of the second aspect, the method further comprises generating the first bit sequence based on discarding all even bits of the at least one predetermined color, and generating the second bit sequence based on discarding all odd bits of the at least one predetermined color.

In a further implementation form of the second aspect, the at least one predetermined color is Red color and/or Blue color.

In a further implementation form of the second aspect, the method further comprises normalizing the intensity of un-discarded color based on the intensity of the discarded colors.

In a further implementation form of the second aspect, the display element comprises a Digital Micromirror Device, DMD, or a Liquid Crystal On Silicon, LCOS, the method further comprises determining, from each bit of the bit sequence, an intensity of light for illuminating the DMD or the LCOS, and relating, a lower significant bit to a lower illumination intensity of the light.

A third aspect of the disclosure provides a computer program comprising program code causing a computer to perform a method according to the second aspect or any of its implementation forms, when being executed on a computer.

A fourth aspect of the disclosure provides a non-transitory computer-readable medium having program code stored in it, wherein the program code, when executed by a processor, causes a method according to the second aspect or any of its implementation forms to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings.

FIG. 3A illustrates another exemplarily scheme of generating a first bit sequence and a second bit sequence from the original bit sequence; and FIG. 3B shows an arrangement of the generated bit sequences at an optical power transition, according to an embodiment of the present disclosure.

FIG. 4 also shows a bit sequence used in an MFD device.

DETAILED DESCRIPTION OF EMBODIMENTS

Figure 1:
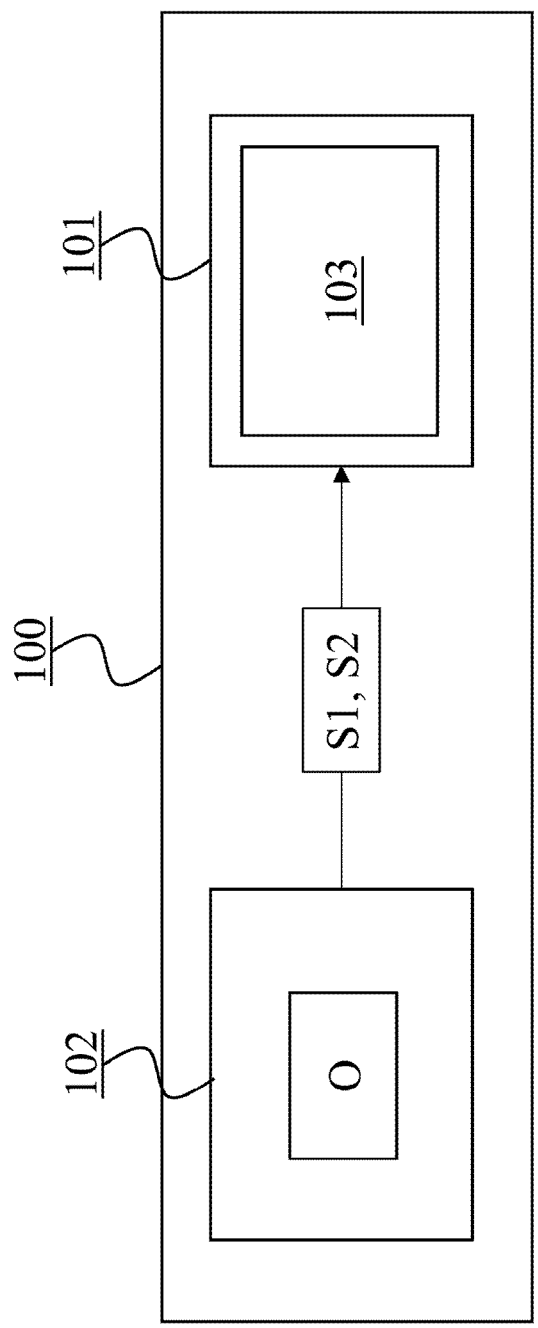
FIG. 1 schematically illustrates a (MFD) device according to an embodiment of the present disclosure.

FIG. 1 schematically illustrates a device 100 according to an embodiment of the present disclosure. The device may be an MFD device 100, which may be an NED device, NTE device or HMD device, or may be provided in any such device. The device 100 may comprise processing circuitry (not shown) configured to perform, conduct or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

The device 100 includes a display element 101, which may comprise a DMD or LCOS, and may further comprise a color element, like a color wheel. Further, the MFD device 100 includes a controller 102, which may be a computer processor, a microcontroller, or the like.

The device 100 comprises a display element 101 configured to generate an image 103.

The device 100 is further comprising a controller 102 configured to control the display element 101 according to at least a first bit sequence S1 provided over a first determined time period and a second bit sequence S2 provided over a second determined time period, in order to generate the image 103 with one or more colors, the bit sequences S1, S2 including for each color a number of bits of different significance.

Moreover, the device 100 is configured to generate the first bit sequence S1 from an original bit sequence O based on discarding at least one bit of a color and to generate the second bit sequence S2 from the original bit sequence O based on discarding at least one other bit of the color.

For example, the device 100 may obtain the original bit sequence O. Moreover, the device 100 may further generate the first bit sequence S1 in which at least one (or some of the bits) of a color are discarded. In addition, the device may generate the second bit sequence S2 from the original bit sequence O by discarding at least one other bit (i.e., one bit or some of the bits which have not been discarded during generating the first bit sequence S1).

The device 100 may further include a storage, which may store, for example, the generated first bit sequence, the second bit sequence, the image, or the time point or time range which may indicate, for instance, the presence of a major ripple within an optical power plateau. Thus, a MSB can be arranged such that it is not affected by this major ripple.

Figures 2A, 2B:
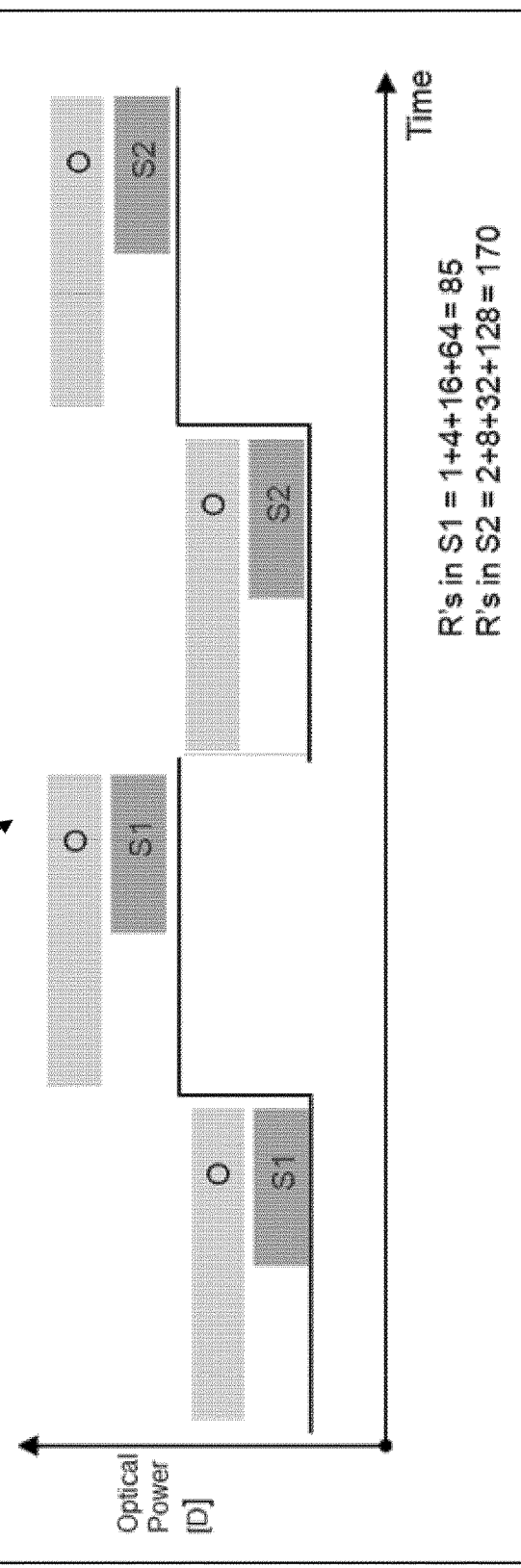
FIG. 2A illustrates an exemplarily scheme of generating a first bit sequence and a second bit sequence from the original bit sequence.
FIG. 2B shows an arrangement of the generated bit sequences at an optical power transition, according to an embodiment of the present disclosure.

FIG. 2A illustrates an exemplarily scheme of generating a first bit sequence S1 and a second bit sequence S2 from the original bit sequence O. FIG. 2B shows an arrangement of the generated bit sequences S1, S2 (and also O) at an optical power transition, according to an embodiment of the present disclosure.

In FIG. 2A, for example, the device 100 generates the first bit sequence S1 (i.e., from the original bit sequence O) based on discarding all even bits of the Red color and Blue color. In other words, in the first bit sequence S1, the even bit colors of R2, B2, R8, B8, R32, B32, R128 and B128 have been discarded.

Moreover, the device 100 further generates the second bit sequence S2 (i.e., from the original bit sequence O) based on discarding all odd bits of the Red color and Blue color. In other words, in the second bit sequence S2, the odd bit colors of R1, B1, R4, B4, R16, B16, R64 and B64 have been discarded.

For generating the second bit sequence S2, the device 100 may discard the bits, which have not been discarded when generating the first bit sequence S1. The generated bit sequences S1, S2 may be used by the controller 102 of the device 100 in order to control the display element 101 to generate the image 103.

FIG. 2B shows the arrangement of the first bit sequence S1, the second bit sequence S2 and the original bit sequence at the optical power transition.

Moreover, in some embodiments, the device 100 may provide a higher frame rate. For example, the device 100 may generate the first bit sequence S1 and the second bit sequence S2, as discussed above. Moreover, the first bit sequence S1 and the second bit sequence S2 may have shorter bit sequence per frame (i.e., compared to the original pattern sequence), and may further have a constant bit sequence rate (binary pattern rate). Hence, the device 100 may be able to provide a higher frame rate. The bit sequence S1 is shorter than the original bit sequence O. The bit sequence S2 is also shorter than the original bit sequence O. For example, the total intensity for Red color (R) in S1 is 85 (i.e., R's in S1=1+4+16+64=85), and the total intensity for Red color in S2 is 170 (i.e., R's in S2=2+8+32+128=170), which may be considered a relatively big intensity difference (e.g., with respect to embodiment of FIG. 3). Besides, the device 100 further normalizes the intensity of the Green color (i.e., the un-discarded color) based on the intensity of the Red color and/or the Blue color, in order to achieve a comparable intensity level as the other colors.

FIG. 3A illustrates another exemplarily scheme of generating a first bit sequence S1 and a second bit sequence S2 from the original bit sequence O; and FIG. 3B shows an arrangement of the generated bit sequences S1, S2 (and also O) at an optical power transition, according to an embodiment of the present disclosure. The generated bit sequences S1, S2 may be used by the controller 102 of the device 100 in order to control the display element 101 to generate the image 103.

In FIG. 3A, the device 100 may, for example, initially arrange (e.g., modify/re-arrange) the original bit sequence O by arranging a less significant bit of a color closer to, or at the same distance to, a start and/or an end of the bit sequence S1, S2 than a more significant bit of the same color.

Figure 4:
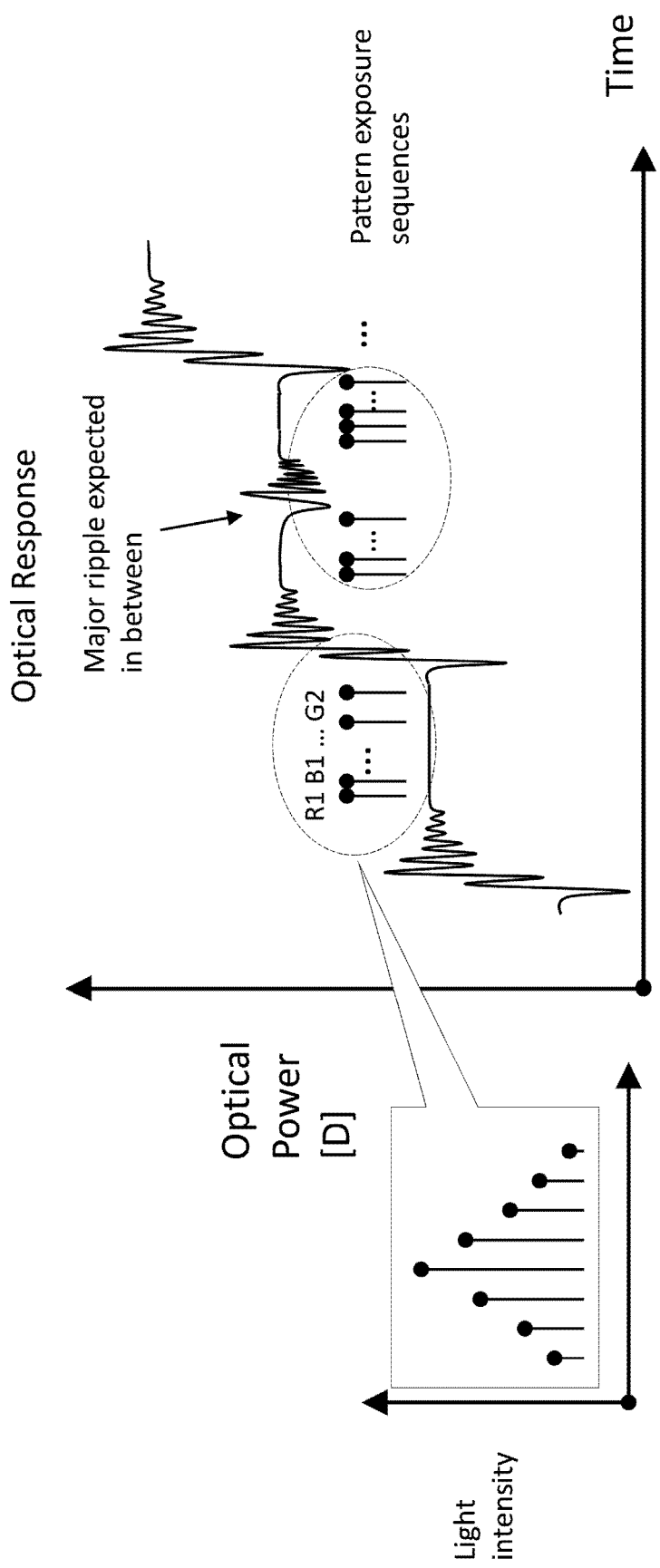
FIG. 4 shows an optical response of a lens during a focal plane transition.

For example, the device 100 may initially arrange the bits R2, G2, B2 close to the start of the bit sequence O (and consequently in S1 and S2), while the bits R1, G1, B1 are arranged close to the end of the bit sequence O (and consequently in S1 and S2). R1, G1 and B1 denote the LSBs of the colors Red, Green and Blue. R2, G2, B2 denote the second-least significant bits of the colors Red, Green and Blue. Accordingly, a less significant bit of each color is arranged closer to, or at the same distance to a start and/or an end of the bit sequence O (and consequently in S1, S2) than a more significant bit of each color. Such an arrangement may reduce the perceived "border" artifacts due to the lens characteristics as it is shown in FIG. 4.

Moreover, the device 100 may then alternatingly discard both Reds and Blues with respect to the bits in S1. For example, the device 100 generates the first bit sequence S1 by discarding the R2, B2, R32, B32, R64, R64, B64, R4 and B4 from the modified (re-arranged) original bit sequence. Moreover, the total intensity for Red color (R) in S1 is 153 (i.e., R's in S1=1+8+16+128=153).

The device 100 further generates the second bit sequence S2, which may use the same modified (re-arranged) original bit sequence pattern followed by the same alternating deletion but with a different bits starting point (at R8/B8 instead of R2/B2 of S1). For example, the device 100 may generate the second bit sequence S2 by discarding the R8, B8, R128, B128, R128, B16, R16, R1 and B1 from the modified (re-arranged) original bit sequence. In other words, the device 100 may generate the second bit sequence S2 by discarding bits, which have not been discarded for generating the first bit sequence S1.

Moreover, the total intensity for Red color (R) in S2 is 102 (i.e., R's in S2=2+4+32+64=102).

Such an initial arrangement (rearrangement or modifying the original bit sequence) and further generating the first bit sequence S1 and the second bit sequence S2 may reduce the intensity variation by having a total intensity of 153 and 102 for S1 and S2, respectively. In this embodiment, an intensity difference of 51 may be obtained instead of 85 (of the embodiment of FIG. 2).

In addition, the device 100 may further normalize the intensity of the Green color (i.e., the un-discarded color) based on the intensity of the Red color and/or the Blue color, in order to achieve a comparable intensity level as the other colors.

Furthermore, the generated first bit sequence S1 and the second bit sequence S2 when used for the next (or previous) focal plane image, only the LSBs may be exposed during optical power transitions, and may thus suffer from the artifacts occurring at these transitions.

Figure 6:
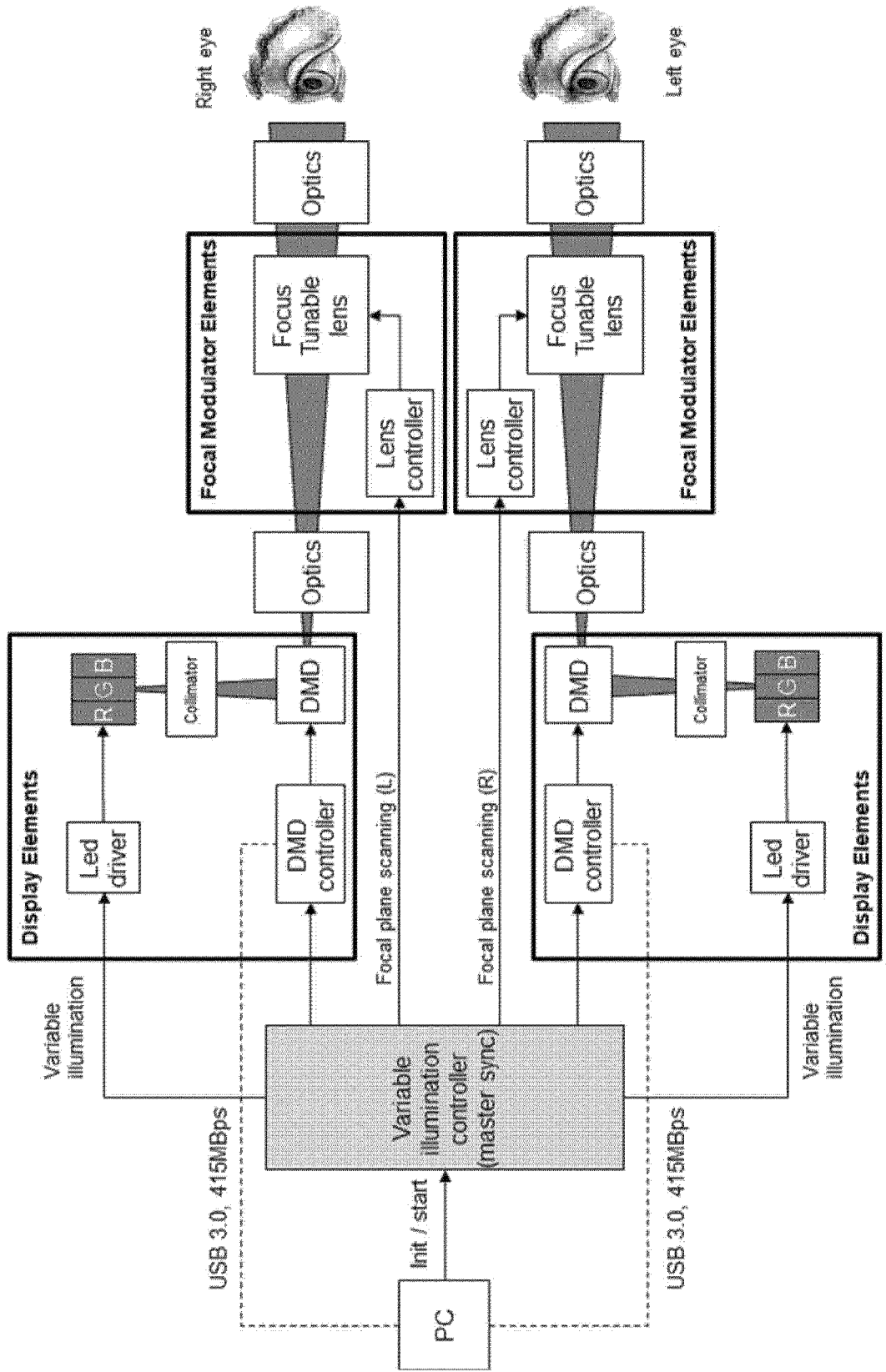
FIG. 6 shows an example MFD device.
Figure 7:
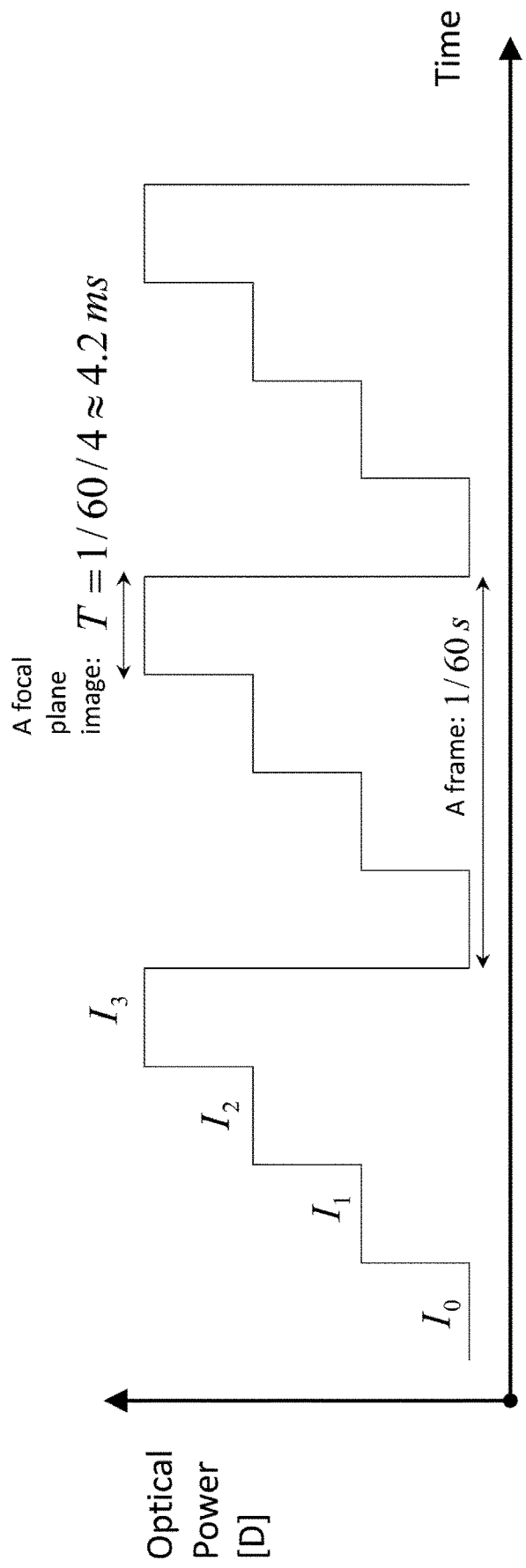
FIG. 7 shows optical power transitions of different focal planes over time.

During the duration of each optical power level, the bit sequences S1 or S2 is provided, and it can be seen that in the critical region of the optical power transition, only the LSBs are illuminated, and thus affected by artifacts, while in an example MFD device (e.g. FIG. 6) also at least one MSB bit, namely B128, is affected.

FIG. 4 shows an optical response of a lens during a focal plane transition. FIG. 4 also shows a bit sequence used in a device 100, particularly MFD device, according to an embodiment of the disclosure.

In some embodiments, a controlled bit sequence (e.g., pattern exposure, a generated first bit sequence, a generated second bit sequence, etc.) may further be provided which may guarantee that each light intensity in the bit sequence falls into the lens optical response region having a relatively constant (steady-state response) optical power. Moreover, each bit sequence (e.g., pattern exposure) might appear with a different offset in a focal plane.

In FIG. 4, an optical power transition between two optical powers is shown over time. During the first optical power plateau no major ripple is experienced. A bit sequence (i.e., R1 B1 . . . G2) is provided such that the light intensity for the illumination light is highest in the center of the plateau. That means the more significant bits are arranged further away from a start and/or end of the provided bit sequence (i.e., R1 B1 . . . G2), while the less significant bits are arranged closer to the start and/or end of the bit sequence.

Furthermore, during a second optical plateau, a major ripple is expectedly experienced at more or less the middle of a predetermined time period.

Therefore, in some embodiments, the predetermined time of the expected major ripple may be obtained. Moreover, a carefully adjusted bit sequence may be provided by the controller 102 to the display element 101, if the position of the major ripple is known in advance. Thus, no light intensity is scheduled in the vicinity of this major ripple.

Figure 5:
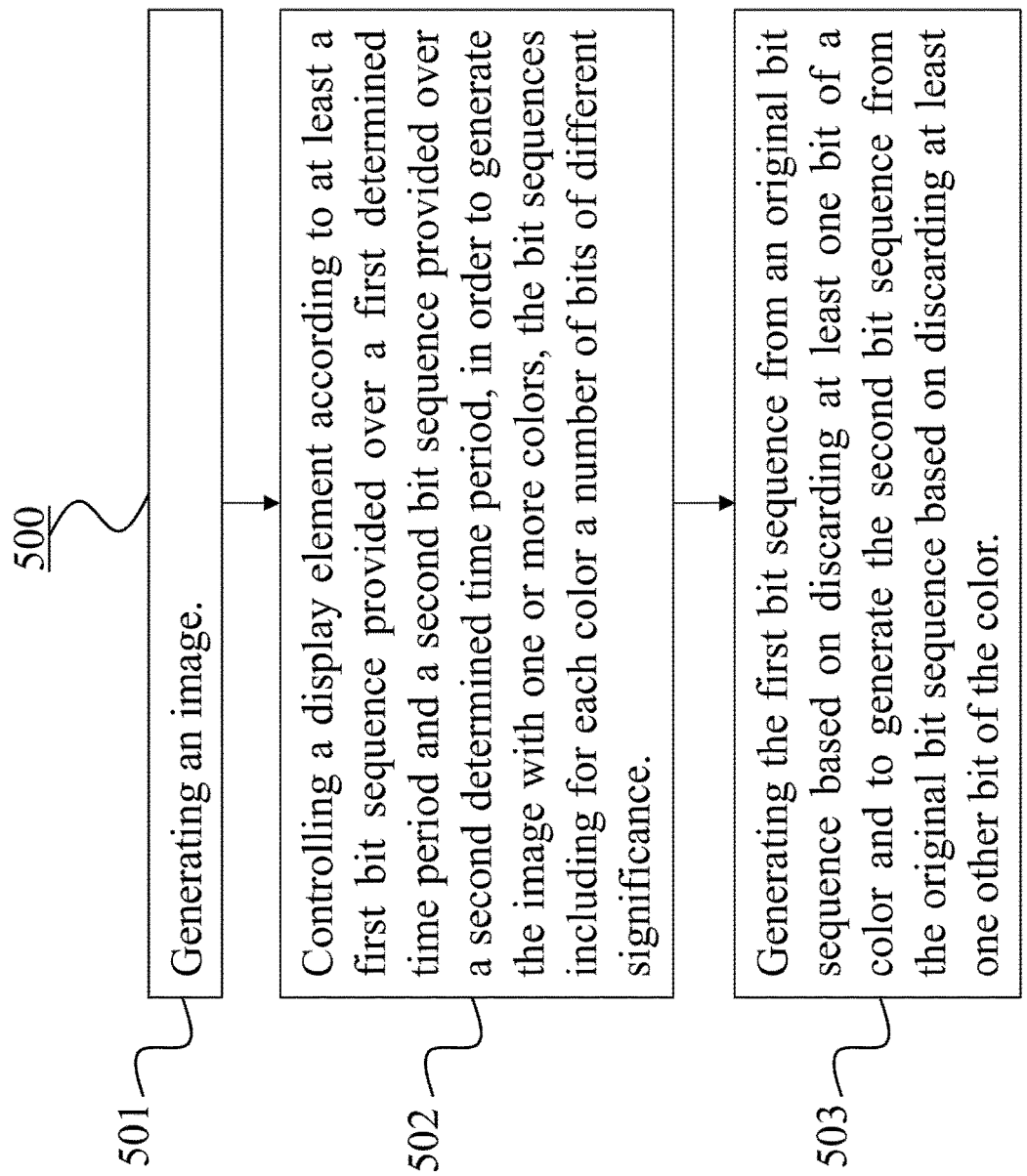
FIG. 5 illustrates a flowchart of a method according to an embodiment of the disclosure.

FIG. 5 shows a method 500 according to an embodiment of the disclosure. The method 500 may be carried out by the device 100, particularly by an MFD device, as it is described above.

The method 500 comprises a step 501 of generating an image 103.

The method 500 further comprises a step 502 of controlling a display element 101 according to at least a first bit sequence S1 provided over a first determined time period and a second bit sequence S2 provided over a second determined time period, in order to generate the image 103 with one or more colors, the bit sequences S1, S2 including for each color a number of bits of different significance.

The method 500 further comprises a step 503 of generating the first bit sequence S1 from an original bit sequence O based on discarding at least one bit of a color and to generate the second bit sequence S2 from the original bit sequence O based on discarding at least one other bit of the color.

The present disclosure has been described in conjunction with various embodiments as examples as well as implementations. However, other variations can be understood and effected by those persons skilled in the art and practicing the disclosure, from studies of the drawings, and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device, comprising
a display element configured to generate an image with one or more colors; and
a controller configured to control the display element according to a first bit sequence provided over a first determined time period and a second bit sequence provided over a second determined time period to generate the image, wherein each of the first bit sequence and the second bit sequence includes, for each color of the one or more colors, a number of bits of different significance;
wherein the device is configured to:
generate the first bit sequence from an original bit sequence based on discarding at least one bit of a color of the one or more colors, and to generate the second bit sequence from the original bit sequence based on discarding at least one other bit of the color of the one or more colors, and
normalize an intensity of un-discarded color based on intensities of discarded colors.

2. The device according to claim 1, wherein generating the first bit sequence from the original bit sequence comprises:
arranging a less significant bit of a first color closer to, or at the same distance to, a start and/or an end of the first bit sequence than a more significant bit of the first color.

3. The device according to claim 1, wherein a bit of given significance of red color and/or blue color is arranged closer to a start and/or and end of the first bit sequence than a bit of the given significance of green color.

4. The device according to claim 1, wherein:
an even bit of a first color is arranged closer to a start of the first bit sequence than an odd bit of the first color, wherein an odd bit of the first color is arranged closer to an end of the first bit sequence than an even bit of the first color.

5. The device according to claim 1, wherein even bits of two or more colors are arranged in the first bit sequence in an order reversed to an order of odd bits of the two or more colors.

6. The device according to claim 1, wherein discarding the at least one bit of a color of the one or more colors comprises:
discarding at least one even bit and/or at least one odd bit of at least one predetermined color of the one or more colors.

7. The device according to claim 6, wherein:
the first bit sequence is generated based on discarding all even bits of the at least one predetermined color; and
the second bit sequence is generated based on discarding all odd bits of the at least one predetermined color.

8. The device according to claim 6, wherein the at least one predetermined color is red color and/or blue color.

9. The device according to claim 1, wherein:
the display element comprises a digital micromirror device (DMD) or a liquid crystal on silicon (LCOS);
each bit of the first bit sequence determines an intensity of light for illuminating the DMD or the LCOS; and
a lower significant bit relates to a lower illumination intensity of the light.

10. The device according to claim 1, wherein:
an odd bit of a first color is arranged closer to a start of the first bit sequence than an even bit of the first color, wherein an even bit of the first color is arranged closer to an end of the first bit sequence than an odd bit of the first color.

11. A method, comprising:
generating an image with one or more colors;
controlling a display element according to a first bit sequence provided over a first determined time period and a second bit sequence provided over a second determined time period to generate the image, wherein each of the first bit sequence and the second bit sequence includes, for each color of the one or more colors, a number of bits of different significance;
generating the first bit sequence from an original bit sequence based on discarding at least one bit of a color of the one or more colors, and generating the second bit sequence from the original bit sequence based on discarding at least one other bit of the color of the one or more colors; and
normalizing an intensity of un-discarded color based on intensities of discarded colors.

12. A non-transitory computer-readable medium storing program code that, when executed by a processor, causes a device to perform:
generating an image with one or more colors;
controlling a display element according to a first bit sequence provided over a first determined time period and a second bit sequence provided over a second determined time period to generate the image, wherein each of the first bit sequence and the second bit sequence includes, for each color of the one or more colors, a number of bits of different significance;
generating the first bit sequence from an original bit sequence based on discarding at least one bit of a color of the one or more colors, and generating the second bit sequence from the original bit sequence based on discarding at least one other bit of the color of the one or more colors; and
normalizing an intensity of un-discarded color based on intensities of discarded colors.

* * * * *